United States Patent Office 2,914,340
Patented Nov. 24, 1959

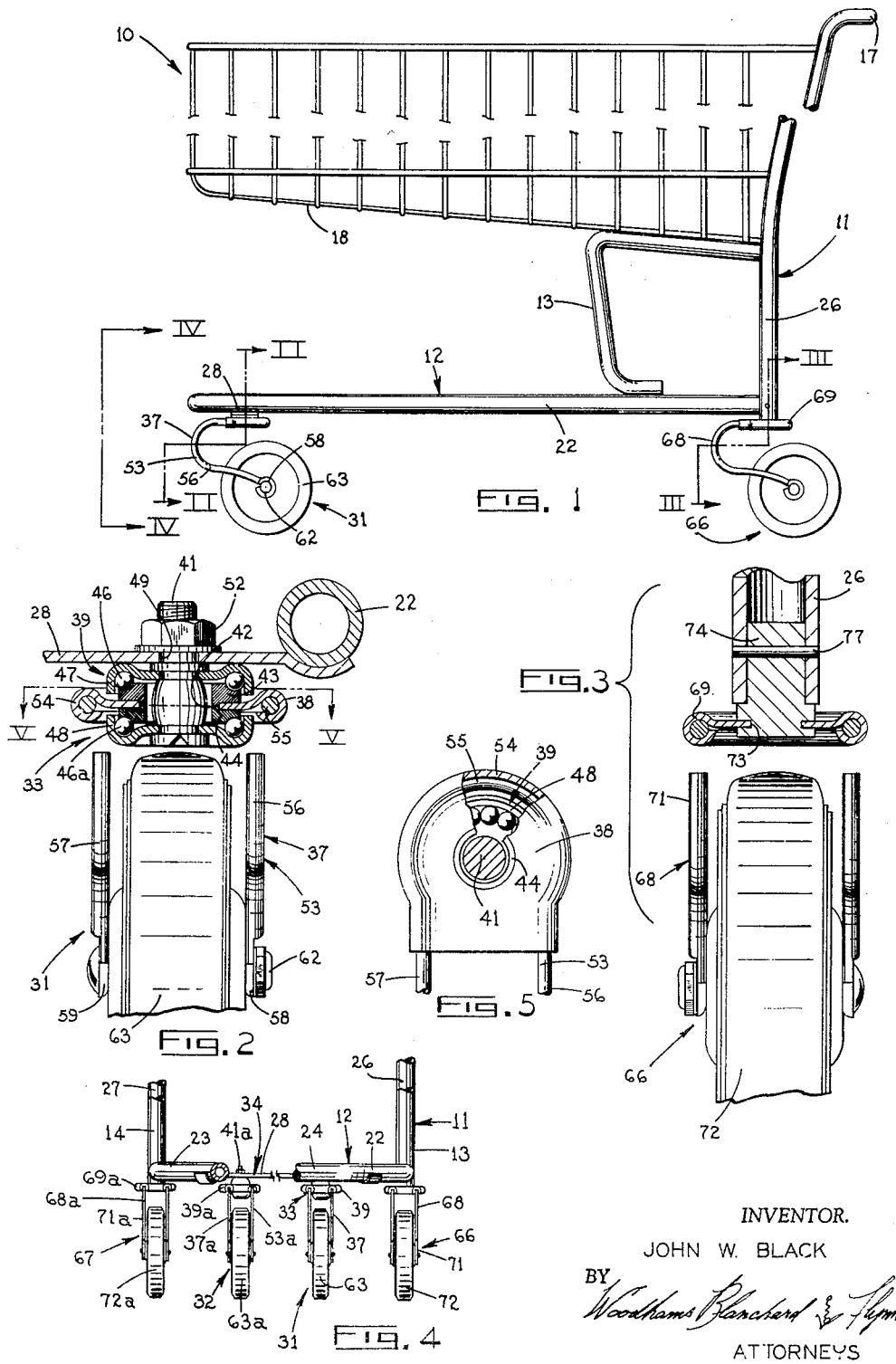

2,914,340

CART HAVING SPRING SUSPENDED CASTER WHEELS

John W. Black, Prairieville Township, Barry County, Mich., assignor to Pemco Wheel Company, Kalamazoo, Mich., a corporation of Michigan Application September 15, 1958, Serial No. 760,968

3 Claims. (Cl. 280—124)

This invention relates in general to a shopping cart having a large article containing basket and a plurality of ground engaging wheels and, more particularly, to a type thereof wherein at least some of the ground engaging wheels on said cart are suspended therefrom by resilient elements, such as curved wire springs.

Persons familiar with the use and operation of shopping carts of the type usually found in supermarkets are well aware of the rough treatment which such carts, and particularly their ground engaging wheels, receive. Heretofore, the cart manufacturers have usually attempted to meet, or at least reduce, the problems resulting from rough treatment by providing strong, heavily braced frame structures and heavy duty wheels and wheel supporting structures. This approach has resulted in cart constructions capable of supporting many times the load which the article containing basket is capable of receiving and, as evidenced by continuous breakdowns, has still not solved the problem. Furthermore, the added strength and resultant rigidity of existing carts causes the shock of impact between the wheels and even small objects in their path to be transmitted substantially undiminished to the contents and handle of the cart. Moreover, the rigidity of the existing wheel supporting structures, created for strength purposes, permits even small objects in the path of the caster wheels to obstruct their movement or cause them to skid.

In pursuing the causes of these breakdowns, it was discovered that the majority of the shock loads received by the cart structure are initiated through the wheels and can be placed in one of two general classes. That is, one class of shock loads is created by impact of one or more of the ground engaging wheels with an obstruction, such as a curb, and the other class results from the lack of contact of all of the wheels with the ground at a given time. The undesirable results of this latter cause can, in turn, be broken down into (1) the added strain upon the supporting wheels which is created by having the entire load supported upon less than all of the wheels, (2) the damage caused by the shimmy or vibrations set up in the wheel when it loses contact with the ground, even for a short period of time, and (3) the shock which occurs when such disengaged wheel re-engages the ground, particularly if it has swiveled out of an aligned position.

It was found that if the structure of the invention is applied to at least the front wheels of a four wheeled shopping cart, for example, most of the above-mentioned problems are greatly reduced. More specifically, if the two front wheels (or the two back wheels) are suspended from the frame of the cart by means of resilient elements, such as wire springs, which extend forwardly and then curve around rearwardly to engage the wheels in a castered position, the primary objects of the invention can be met. By using all spring suspended wheels on the shopping cart, an even greater improvement is realized.

In the first place, even where just the front or rear wheels of a four wheeled cart are spring suspended, a certain amount of self-leveling is produced. That is, one or both of the front spring suspensions will automatically flex in response to irregularities in the cart supporting surface, regardless of whether such irregularities are engaged by the front or rear wheels. This self-leveling feature becomes more effective as the load in the cart increases and, therefore, increases the protection in proportion to the need.

In the second place, impact shocks sustained by the front wheels are absorbed by the flexing of the springs so that the amount of such shock load transmitted to the frame structure of the cart is greatly reduced. Thirdly, because of the self-leveling aspects, all of the ground engaging wheels are almost always and continuously in engagement with the usual type of wheel supporting surface, thereby reducing to a minimum the periods of time during which less than four wheels are supporting the entire load. More importantly, the self-leveling feature reduces the time during which any one of the wheels is completely free of the ground and, as a result, able to oscillate, vibrate and shimmy or otherwise move in an unpredictable manner into a position where its re-engagement with the supporting surface will create a violent shock load. Having in this manner reduced the amount of shock which must be absorbed by the frame structure of the cart, it becomes possible to fabricate shopping carts which are of ample strength to support the load which they are intended to carry and which are lighter in weight and, therefore, easier to fabricate and operate.

It will be recognized that reference is made to a four wheeled shopping cart for illustrative purposes, only. That is, the substance of the invention can be applied to carts or the like having three or six wheels, for example. Moreover, many of the objects of the invention are met where the improved wheel mounting structure is applied to a two wheeled, carry-out cart.

Accordingly, the primary object of this invention has been the provision of a shopping cart having a plurality of ground engaging wheels, at least some of which are suspended from and mounted upon the frame structure of the cart by curved and elongated spring elements which place the suspended wheel in a castered position.

A further object of this invention has been the provision of a cart construction including spring suspended ground engaging wheels, as aforesaid, whereby the shock loads imposed upon the wheels and wheel supporting means are reduced, wherein the transmission of such shock loads to the frame structure of the cart is greatly reduced, wherein the cart can be produced with less difficulty and from lighter materials than previous carts for the same or similar purposes, wherein the damage to the cart resulting from abusive operation is greatly reduced, wherein the resultant shopping cart can be operated with considerably more comfort to the operator because the shock loads previously transmitted from the wheels to the operator through the frame structure are greatly reduced by the spring suspension of the wheels.

Other objects and purposes of this invention will become apparent to persons familiar with this type of equipment upon reading the following specification and examining the accompanying drawings, in which:

Figure 1 is a broken side elevational view of a shopping cart embodying the invention.

Figure 2 is a sectional view taken along the line II—II in Figure 1.

Figure 3 is a sectional view taken along the line III—III in Figure 1.

Figure 4 is a broken fragment of the front elevation of said shopping cart of Figure 1, as indicated by the cutting line IV—IV therein.

Figure 5 is a sectional view taken along the line V—V in Figure 2.

For the purpose of convenience in description, the terms "upper," "lower" and derivatives thereof will have reference to the structure embodying the invention in its normal position of operation, as shown in Figure 1. The terms "front," "rear" and derivatives thereof will have reference, respectively, to the left and right ends of the cart structure shown in Figure 1. The terms "inner," "outer" and derivatives thereof will have reference to the geometric center of said cart structure and parts thereof.

General description

The objects and purposes of the invention, including those set forth above, have been met by providing a shopping cart having a frame structure including a base member, and an upright support structure mounted upon and extending upwardly from the rearward end of said base member, said support structure including a handle and means for supporting an article carrying basket. The frame structure is supported, in this particular embodiment, upon four wheels, the axes of which are castered or offset with respect to their points of engagement with the base member. For purposes of illustration, the two front casters are swiveled with respect to the base member and the two rear casters are non-swiveled with respect to said base member. However, it will be seen that all four casters may be either swiveled or fixed as desired.

At least two, and preferably four, of the casters have yokes which include a pair of arcuate, spaced and co-extensive spring elements upon and between which the caster wheels are rotatably supported. Thus, said caster wheels are suspended from and thereby support the frame structure by curved spring elements. Under some circumstances the rear wheels may be mounted upon conventional caster yokes in a substantially conventional manner.

Detailed construction

The shopping cart 10 (Figure 1), herein selected to illustrate one embodiment of the invention, is comprised of a frame structure 11 including a base member 12, a pair of upright frame members 13 and 14 (Figure 4) mounted upon the rearward end of the base member 12 and interconnected at their upper ends by the handle 17 (Figure 1). An article carrying basket 18 is supported upon and between the upper portions of the upright frame members 13 and 14 so that it extends forwardly therefrom. The various above-mentioned parts of the frame structure 11 may be, and preferably are, secured with respect to each other by conventional means, such as welding, bolting or the like. Generally speaking, frame structures of the type set forth above, which are designed for the nesting type of operation, are well-known in the art, and any one of such structures is adaptable to my invention.

The base member 12 (Figures 1 and 2) is advantageously fabricated from tubular, metallic material which is formed in a U-shape providing a pair of rearwardly diverging side elements 22 and 23 which are connected together at their front ends by the integral end element 24. The upright frame members 13 and 14 include a pair of upright tubular posts 26 and 27 (Figure 4), to which the rearward ends of the side elements 22 and 23 are respectively secured, as by welding, near the lower ends of said posts. The tubular posts 26 and 27 are preferably substantially perpendicular to a plane defined by the side elements 22 and 23.

A mounting plate 28 (Figures 2 and 4) extends between and is secured to the side elements 22 and 23 near the front ends thereof by conventional means such as welding. The mounting plate 28 is preferably disposed directly rearwardly of, and parallel with, the end element 24. A pair of front casters 31 and 32 (Figure 4) which have swivel assemblies 33 and 34, respectively, are mounted upon and extend downwardly from the mounting plate 28. The front casters 31 and 32 may be substantially similar to the "Spring Suspended Caster Structure" disclosed in my patent application Serial No. 726,536.

More specifically, and for purposes of illustration, the front caster 31 (Figure 2) is comprised of a caster yoke 37 having a swivel plate 38 engaged by the swivel bearing assembly 39 which is supported upon the mounting plate 28 by means of the king pin or spindle 41. The swivel plate 38 has a central opening 42 through which the spindle 41 extends. The bearing assembly 39 includes a pair of adjacent and coaxial thrust rings 43 and 44 between which the swivel plate 38 is clamped adjacent to said opening 42 therein. A plurality of bearing balls 46 and 46a are held respectively between the thrust rings 43 and 44 and the bearing ball retainer rings 47 and 48. The retaining rings 47 and 48 may be secured upon the spindle 41 by forging and staking operations, respectively. The upper end of the spindle 41, which is externally threaded, is slidably received through an opening 49 in the mounting plate 28 near the side element 22. The retaining ring 47 is held snugly against the lower surface of the mounting plate 28 by means including the nut 52 which engages the spindle 41. Accordingly, the swivel plate 38, hence the caster yoke 37, is free to pivot about the axis of the spindle 41 by means of the bearing assembly 39.

The caster yoke 37 includes a U-shaped spring member 53 which is fabricated from a resiliently flexible, metal rod having a pair of substantially parallel and coextensive spring elements 56 and 57 which extend away from the curved and closed end portion 55 of said spring member. The swivel plate 38 has a downwardly and inwardly curving flange 54 which firmly embraces the end portion 55 of said spring member 53 and the adjacent ends of the spring elements 56 and 57. Said spring elements extend away from one edge of the swivel plate 38 and then simultaneously and identically curve downwardly and then backwardly through an angle in excess of 135°. The lower free end portions of the elements 56 and 57 are bent or otherwise constructed to provide circular, coaxial openings 58 and 59, respectively, through which the opposite ends of the caster wheel shaft 62 are slidably received. A caster wheel 63 is rotatably supported upon the shaft 62 between the elements 56 and 57, the axis of said wheel being on the opposite side of the extended axis of the spindle 41 from the curved portions of said spring elements, whereby the castering and shock absorbing results are accomplished. The front caster 32, which includes the yoke 37a, the bearing assembly 39a, the spindle 41a, the spring member 53a and the wheel 63a, may be and preferably is substantially identical with the front caster 31 described above in detail.

The rear end of the frame structure 11 is supported upon a pair of rear casters 66 and 67 (Figure 4), which may under some circumstances be of a substantially conventional construction. In this embodiment, however, the rear caster 66, for example (Figures 1 and 3), is comprised of a caster yoke 68 including a spindle plate 69, a U-shaped spring member 71 and a caster wheel 72 which may be, and preferably are, substantially identical to their counterparts in the front caster 31, as set forth above. The spindle plate 69 has a central opening 73 into which a spindle 74 is received and then tightly secured by a forging operation. The spindle 74 is snugly received into the hollow lower end of the tubular post 26 where it is held against rotation by convenient means, such as the lock pin 77, which extends completely through both said post 26 and said spindle 74.

The rear caster 67 (Figure 4) which includes a yoke 68a, a spindle plate 69a, a spring member 71a and a caster wheel 72a, may be substantially identical to the rear caster 66 described above.

Operation

Where spring suspended, front and rear casters are used on the shopping cart 10, as shown in Figure 1, the spring members 53, 53a, 71 or 71a will flex upwardly under the weight of the cart in order to effect an automatic leveling which overcomes at least the usual minor irregularities in the wheel supporting surface. That is, the initial load of the cart will tend to make all of said spring members 53 and 71 flex upwardly a predetermined amount. If an irregularity in the wheel supporting surface is encountered by any of said wheels, the spring member engaging such wheel will flex upwardly or downwardly to effect continuous engagement between said wheel and the wheel supporting surface, in spite of such irregularities. Thus, overloading resulting from support of the cart by less than all four caster structures is minimized, shocks created by intermittent engagement and disengagement of the various wheels with the support surface are substantially reduced and the shimmy or other vibrations resulting from temporary disengagement of a particular wheel from its supporting surface is also substantially reduced. Furthermore, if any of said caster wheels strikes an object as it is moving along the wheel supporting surface the lower end of the spring member supporting such wheel will be flexed upwardly and rearwardly so that (1) the shock of impact will be materially reduced and (2) the wheel will be able in many instances to roll over the object, thereby preventing the abrupt stopping of the shopping cart or the skidding action which frequently and presently occurs with existing caster constructions.

Under some circumstances, at least some of the objects and purposes of the invention can be carried out wherein the rear casters on the shopping cart 10 are of a substantially conventional and rigid construction. However, it will be recognized that wherever a rigid, non-flexible and non-resilient type of yoke structure is employed, additional strength in the corresponding portion of the frame structure 11 may be required to withstand the effects of the shock loads transmitted to such frame structure as a result of the rigid yokes.

The spring suspended yoke of the invention, by materially reducing the transfer of shock loads from the ground engaging wheels to the frame structure, permits a very material reduction in the strength requirements of the frame structure. Furthermore, and of equal importance insofar as maintenance and trouble-free operation are concerned, the reduction of the shock load transfer produced by the spring members 53 and 71 also reduces the strength requirements for the casters, the caster bearings and their attachment to the frame structure 11 for any given type of existing use. Accordingly, the possibility of loose or distorted casters or caster mountings is also reduced, thereby extending the useful life of such structures.

Although a particular preferred embodiment of the invention has been disclosed in detail above for illustrative purposes, it will be understood that variations or modifications of such disclosure, which lie within the scope of the appended claims, are fully contemplated.

What is claimed is:

1. In a shopping cart having a frame structure, an article holding basket supported thereon and a handle, the combination comprising: a U-shaped base member defining a substantially horizontal plane and supporting said frame structure; a pair of swivel casters mounted upon the front end of said base member, each swivel caster including swivel bearing means, a pair of similar arcuate, substantially parallel and co-extensive spring elements supported by said bearing means and a caster wheel rotatably supported upon and between said spring elements, said spring elements extending forwardly and then being reversely curved and extending downwardly and rearwardly to a point below the connection of said swivel caster to said base member, said wheel being secured to said spring elements at said point; and a pair of casters mounted upon said frame structure near the rear end of said base member, each of the rearward casters including frame engaging means, a pair of arcuate, substantially parallel and co-extensive spring elements secured to said frame engaging means, said last-mentioned pair of spring elements being similar in shape to the first-mentioned pair of spring elements and a caster wheel rotatably supported upon and between said spring elements.

2. The structure of claim 1 wherein the spring elements in each caster comprise the legs of a one-piece, U-shaped, leaf type spring rod; a mounting plate, the closed end of the U-shaped spring rod being rigidly secured to said mounting plate, the mounting plate on each front caster being pivotally supported by the bearing means and the mounting plate on each rear caster being rigidly secured to the frame structure.

3. In a shopping cart having a frame structure, an article holding basket supported thereon and a handle, the combination comprising; a U-shaped base member defining a substantially horizontal plane and supporting said frame structure; a pair of swivel casters mounted upon the front end of said base member, each swivel caster including swivel bearing means, a mounting plate secured to the swivel bearing means for each swivel caster and being supported thereby for rotatable movement with respect to said base member; a one-piece, substantially U-shaped, spring rod for each swivel caster, the web and adjacent portions of the legs of said spring rod extending horizontally and partially surrounding said swivel bearing means and being fixedly secured to said mounting plate for rotatable movement therewith with respect to said base member, the legs of said spring rod located forwardly of said swivel bearing means being reversely curved downwardly and extending downwardly and rearwardly therefrom to a point located below and positioned rearwardly from the point at which said swivel caster is secured to said base member; a caster wheel rotatably supported on and between the legs of each spring rod at said point; a pair of casters mounted on said frame structure adjacent the rear end of said base member, each of said last-mentioned pair of casters including a U-shaped spring rod shaped corresponding to the shaping of the first-mentioned spring rod; and a caster wheel rotatably supported on the U-shaped spring rod of each of said last-mentioned pair of casters.

References Cited in the file of this patent

UNITED STATES PATENTS

| 2,435,022 | Troendle | Jan. 27, 1948 |
| 2,453,916 | Inskeep | Nov. 16, 1948 |
| 2,479,530 | Watson | Aug. 16, 1949 |

FOREIGN PATENTS

| 450,893 | Great Britain | July 27, 1936 |
| 532,149 | Great Britain | Jan. 17, 1941 |